United States Patent

Tomogami et al.

Patent Number: 5,672,113
Date of Patent: Sep. 30, 1997

[54] CYLINDRICAL BOOT FIXING PORTION OF RESIN BOOT WITH ANNULAR EXTERIOR CONVEX PORTION

[75] Inventors: Shin Tomogami, Shizuoka-ken; Masuo Takaki, Itami; Yoshikazu Fukumura; Takeshi Ikeda, both of Iwata; Kenji Terada, Shizuoka-ken, all of Japan

[73] Assignee: NTN Corporation, Osaka, Japan

[21] Appl. No.: 665,350

[22] Filed: Jun. 17, 1996

Related U.S. Application Data

[63] Continuation of Ser. No. 216,458, Mar. 23, 1994, abandoned.

[30] Foreign Application Priority Data

| Sep. 28, 1993 | [JP] | Japan | 5-240883 |
| Sep. 28, 1993 | [JP] | Japan | 5-240884 |
| Nov. 30, 1993 | [JP] | Japan | 5-299195 |

[51] Int. Cl.⁶ .................... F16D 3/84
[52] U.S. Cl. .................... 464/175; 277/212 F
[58] Field of Search .................... 464/170, 173, 464/175; 277/212 FB, 101

[56] References Cited

U.S. PATENT DOCUMENTS

| 3,583,244 | 6/1971 | Teinert | 464/175 |
| 3,807,195 | 4/1974 | Faulbecker | 277/212 |
| 4,210,002 | 7/1980 | Doré | 464/175 |
| 4,456,269 | 6/1984 | Krude et al. | 464/175 X |
| 4,673,188 | 6/1987 | Matsuno et al. | 464/175 X |
| 4,957,469 | 9/1990 | Zollinger | 464/175 |

FOREIGN PATENT DOCUMENTS

| 288694 | 11/1988 | European Pat. Off. | 464/170 |
| 2073843 | 10/1971 | France . | |
| 2619608 | 2/1989 | France . | |
| 278624 | 5/1990 | Germany | 464/170 |
| 40 2225826 | 9/1990 | Japan | 464/170 |
| 40 2245519 | 10/1990 | Japan | 464/170 |
| 119122 | 6/1947 | Sweden | 464/173 |
| 1163133 | 9/1969 | United Kingdom . | |
| 1296607 | 11/1972 | United Kingdom . | |
| 2144200 | 1/1992 | United Kingdom . | |
| 2245665 | 1/1992 | United Kingdom . | |

Primary Examiner—Daniel P. Stodola
Assistant Examiner—Eileen A. Dunn
Attorney, Agent, or Firm—Nikaido, Marmelstein, Murray & Oram LLP

[57] ABSTRACT

A boot fixing portion (12) has an annular convex portion (17) integrally formed on the outer periphery thereof and an annular projection (19) integrally formed on the inner periphery thereof in opposed relation to the convex portion (17), the annular projection (19) being adapted to engage an engaging groove (18) formed in the outer periphery of the outer member (14) of a constant velocity joint (13).

4 Claims, 10 Drawing Sheets

CYLINDRICAL BOOT FIXING PORTION OF RESIN BOOT WITH ANNULAR EXTERIOR CONVEX PORTION

SPECIFICATION

This application is a continuation of application Ser. No. 08/216,458 filed Mar. 23, 1994, now abandoned.

BACKGROUND OF THE INVENTION

The present invention relates to a resin boot adapted to be attached to a constant velocity joint for automobiles or the like.

Heretofore, resin boots have been known, including, for example, one shown in FIGS. 21 and 22. A resin boot 1 is made of a resin material, such as TPEE (thermoplastic synthetic resin elastomer) or urethane, integrally comprising a bellows portion 2 having alternate ridges and troughs with the ridge diameter gradually decreasing as it extends from one end to the other, and cylindrical boot fixing portions 3 continuous to both ends of the bellows portion 2. And the boot fixing portion 3 on the larger diameter side is fixed to the outer member 5 of a constant velocity joint 4 and the boot fixing portion 3 on the smaller diameter side is fixed to a shaft 6, tightened respectively by a boot band 7 formed of iron plate, whereby the resin boot 1 is attached between the outer member 5 of the constant velocity joint 4 and the shaft 6.

As shown enlarged in FIG. 22, the boot fixing portion 3 is internally integrally formed with an annular inner peripheral projection 8 which engages an annular groove 9 formed in the outer periphery of the outer member 5 (and the shaft 6), thereby effecting the axial positioning of the resin boot 1 and obtaining the strength to prevent the boot fixing portion 3 from axially slipping off and the sealing performance.

In the resin boot 1 described above, increasing the height of the inner peripheral projections 8 of the boot fixing portions 3 would be desirable from the stand point of obtaining the strength to prevent the boot fixing portions 3 from axially slipping off and the sealing performance in that it enables the inner peripheral projections 8 to firmly engage the annular grooves 9 in the outer member 5 and shaft 6.

However, in the resin boot 1, the inner peripheral projections 8 that can be formed on the inner peripheries of the boot fixing portions 3 are limited in size by problems encountered in the molding process; particularly, the height of the inner peripheral projections 8 cannot be increased so much. The reason is that generally the resin boot 1 is molded in the injection molding process by injecting a resin material into a cavity in a mold having inner and outer mold sections or in the blow molding process by inserting a tubular resin material into a mold comprising a mold section having annular projections for forming inner peripheral projections 8 and blowing air into the tube to blow the latter so as to press It against the inner peripheral surface of the mold, if the inner peripheral projections 8 are excessively high, then in the case of the former, or injection molding, a problem arises that the inner peripheral projections 8 cannot be withdrawn from the mold when the inner and outer mold sections are to be separated and in the case of the latter, or the blow molding, a problem likewise arises that the degree of the projections for forming the inner peripheral projections 8 becomes too great, making it difficult to mold the inner peripheral projections 8.

Further, the hardness of the resin boot 1 is as high as HD 50 and as compared with rubber boots, it does not so much tend to elastically deform; thus, if the inner peripheral projections 8 are too high, the operation of fitting the boot fixing portions 3 on the outer member 5 and shaft 6 becomes difficult.

For the reason described above, in the resin boot 1, the inner peripheral projections 8 are sized relatively small in height, while boot bands of high tightening force designed for exclusive use with resin boots are used to firmly tighten the boot fixing portions 3 from the outside to elastically deform them, thereby engaging the inner peripheral projections 8 with the annular grooves in the outer member 5 and shaft 6, thus obtaining the strength to prevent the fixing portion 3 from axially slipping off and the sealing performance after attachment. Therefore, in the resin boot 1, it is necessary to use expensive, resin boot-exclusive boot bands, leading to a high cost. Further, because of the resin boot having a high hardness and little tendency to elastically deform, the dimensional accuracies of the outer peripheries of the outer member 5 and shaft 6 and the inner peripheries of the boot fixing portions 3 have to be high as compared with rubber boots, also leading to an increase in cost.

SUMMARY OF THE INVENTION

The present invention has been proposed with the above in mind and is intended to obtain the resin boot slip-off preventing strength and the sealing performance while attaining a cost reduction.

To achieve said object, the invention provides a resin boot having a cylindrical boot fixing portion at an end thereof adapted to be fixed in position to a mating member by a boot band, said boot fixing portion being engaged at an inner periphery thereof with an annular groove formed in an outer periphery of said mating member, wherein an outer periphery of said boot fixing portion is formed with an annular convex portion opposed to said annular groove.

Also the invention provides a resin boot as set forth in the above, wherein said annular convex portion is integrally formed on said outer periphery of said boot fixing portion.

Further the invention provides a resin boot as set forth in the above, wherein said annular convex portion is formed by fitting an annular member on said outer periphery of said boot fixing portion.

Further the invention provides a resin boot as set forth in the above, wherein said annular convex portion is formed by forming an annular fitting groove in said outer periphery of said boot fixing portion and fitting in said annular fitting groove an annular member whose sectional height is greater than the depth of said fitting groove.

Further the invention provides a resin boot attaching structure comprising a cylindrical boot fixing portion formed at an end of a resin boot being fitted on an outer periphery of a mating member, with a tightening force of a boot band applied to an outer periphery of said boot fixing portion, an inner periphery of said boot fixing portion engaging an annular groove formed in said outer periphery of said mating member, whereby said boot fixing portion being fixed in position to said mating member, wherein said outer periphery of said boot fixing portion is formed with an annular convex portion opposed to said annular groove, said outer periphery of said mating member is formed with annular projections disposed close to the shoulders of said annular groove.

Further the invention provides a resin boot attaching structure as set forth in the above, wherein said outer periphery of said boot fixing portion is formed with an annular convex portion opposed to said annular groove and annular convex portions axially displaced from the first-mentioned convex portion beyond the positions where said projections are formed.

Since the invention has the arrangement described above, when the boot band is fitted on the outer periphery of the boot fixing portion fitted on the mating member to tighten the boot fixing portion, the annular convex portion formed on the outer periphery of the boot fixing portion is pressed radially inward by the tightening force of the boot band, such pressing force causing the elastic deformation of the restricted region of the boot fixing portion corresponding to the position where the convex portion is formed, the inner periphery thereof being displaced to the annular groove of the mating member for firm engagement and intimate contact therewith.

The formation of annular projections on the outer periphery of the mating member adjacent the shoulders of the annular groove ensures that when the restricted region of the boot fixing portion is elastically deformed under the pressing force from the convex portion, the inner periphery of the boot fixing portion is pressed hard against the projections and the stresses in that region are locally increased. As a result, the elastic deformation of the boot fixing portion is accelerated, making it easier for the inner periphery thereof to be displaced toward the annular groove in the mating member; after attachment, the projections penetrate into the inner periphery of the boot fixing portion to firmly hold the latter.

The formation, in addition to the convex portion opposed to the annular groove, of annular convex portion axially displaced from the first-mentioned convex portion beyond the positions where the projections are formed results in the restricted regions of the boot fixing portion being pressed from the two convex portions with the projections serving as fulcrums, further accelerating the elastic deformation of the boot fixing portion and increasing the amount of penetration of the projections after attachment.

The two arrangements described above refer to the provision of the annular groove and projections on the outer periphery of the mating member; however, without providing the annular groove, a plurality of projections may be formed at predetermined intervals while forming the outer periphery of the boot fixing portion with annular convex portions which are axially displaced from the positions where the projections are formed. Such arrangement still functions in the same way. In this case, the inner periphery of the boot fixing portion is fixed in position by engagement with the projections.

In the present invention, since the annular convex portion formed on the outer periphery of the boot fixing portion is adapted to be pressed toward the inner side by the tightening force of the boot band, even if expensive resin boot-exclusive boot band is not used as it is used in the prior art, it is possible to elastically deform the boot fixing portion by the necessary amount to allow the inner periphery thereof to firmly engage and intimately contact the annular groove of the mating member. Therefore, according to the present invention, it is possible to reduce cost while obtaining the resin boot slip-off preventing strength and the sealing performance.

Further, since It is only necessary to form convex portion on the outer periphery of the boot fixing portion, there is no increase in the number of parts or in production cost, as compared with the conventional construction. Furthermore, the attaching operation is very easy.

Further, the formation of the annular projections on the outer periphery of the mating member in the vicinity of the shoulders of the annular groove accelerates the elastic deformation of the boot fixing portions and, after attachment, allows the projections to penetrate into the inner periphery of the boot fixing portion to firmly hold the latter, thus further enhancing the resin boot slip-off preventing strength and the sealing performance.

Further, the formation, in addition to the convex portion opposed to the annular groove, of annular convex portions on the outer periphery of the boot fixing portion axially displaced beyond the positions where the projections are formed accelerates the elastic deformation of the boot fixing portion and, after attachment, ensures an increased amount of penetration of the projections into the inner periphery of the boot fixing portion to firmly hold the latter, thus further enhancing the resin boot slip-off preventing strength and the sealing performance.

Further, the same effects as described above can be attained by forming the outer periphery of the mating member with a plurality of annular projections, rather than the annular groove, at predetermined intervals and forming the outer periphery of the boot fixing portion with annular convex portions axially displaced from the positions where the projections are formed.

With the elastic deformation of the boot fixing portion thus accelerated, the dimensional control of the outer periphery of the mating member and the inner periphery of the boot fixing portion is allowed to be made least severely, leading to a cost reduction.

DESCRIPTION OF THE PREFERRED EMBODIMENTS

Embodiments of the invention will now be described with reference to the drawings.

Figure 1:
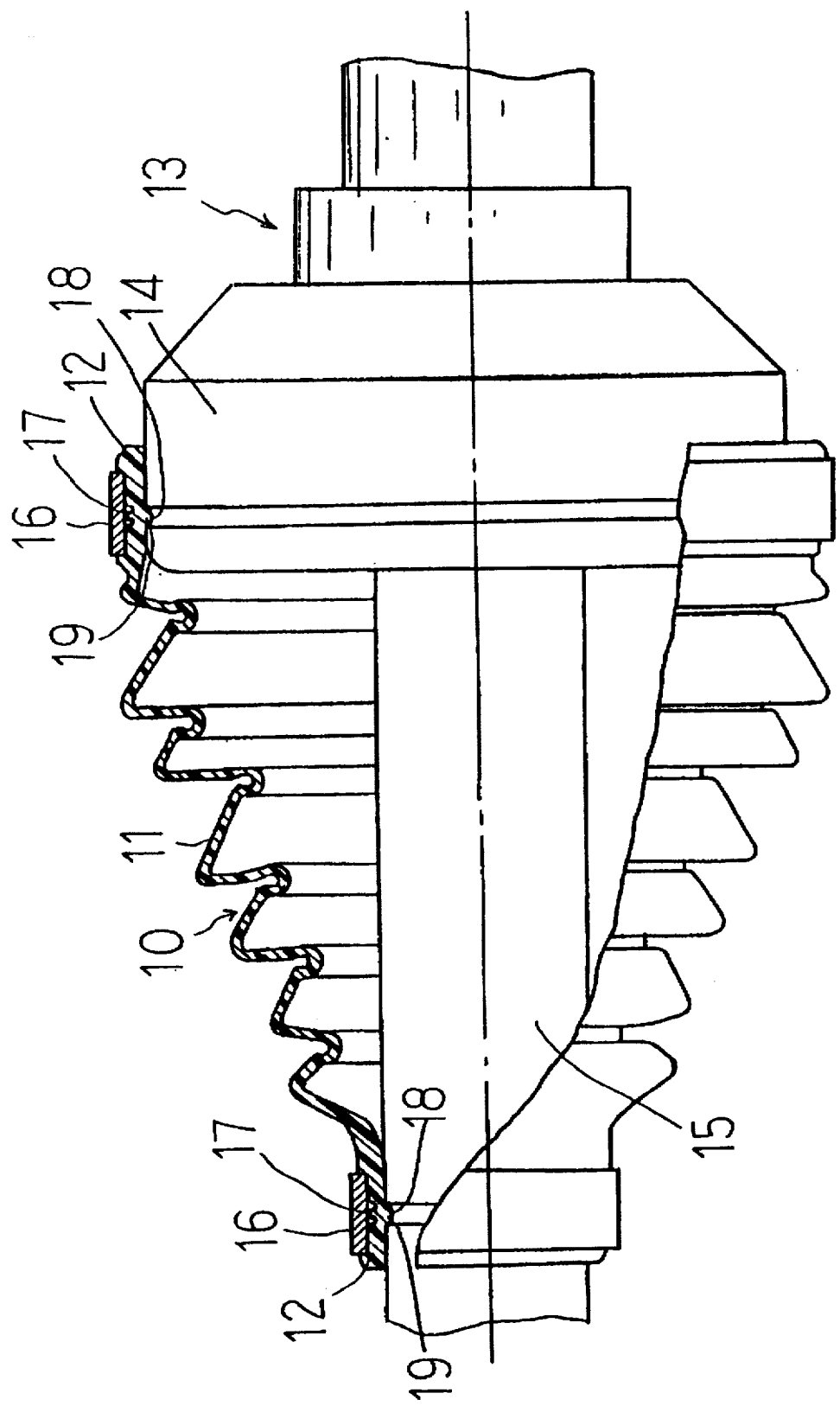
FIG. 1 is a view, partly in longitudinal section, showing a resin boot according to an embodiment of the present invention, attached to a constant velocity joint.
Figure 2:
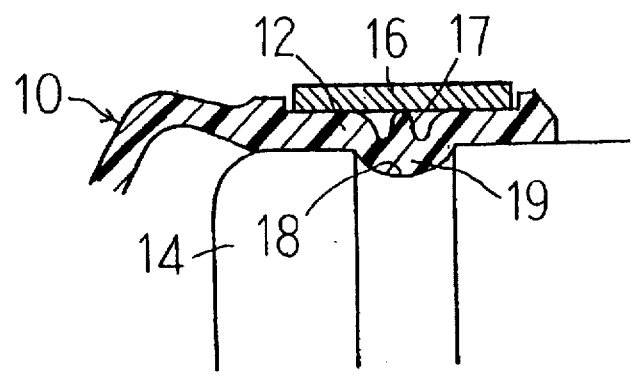
FIG. 2 is a fragmentary enlarged view in longitudinal section, showing the boot fixing portion in FIG. 1.

FIG. 1 is a view, partly in longitudinal section, showing a resin boot 10 according to the invention, attached to a constant velocity joint 13, and FIG. 2 is a fragmentary enlarged view, in longitudinal section, of FIG. 1.

The resin boot 10 is made of TPEE (thermoplastic synthetic resin elastomer) or urethane by injection molding or blow molding, integrally comprising a bellows portion 11 having alternate ridges and troughs with the ridge diameter gradually decreasing from one end to the other, and cylindrical boot fixing portions 12 continuous to both ends of the bellows portion 11. The resin boot 10 has its boot fixing portion 12 on the larger diameter side fixed to the outer member 14 of a constant velocity joint 13 and its boot fixing portion 12 on the smaller diameter side fixed to a shaft 15, tightened respectively by a boot band 16 formed of iron plate, whereby the resin boot 10 is attached between the outer member 14 of the constant velocity joint 13 and the shaft 15.

The boot fixing portion 12, as shown in FIG. 2, has an annular convex portion 17 integrally formed on the outer periphery thereof and an annular inner peripheral projection 19 integrally formed on the inner periphery thereof in opposed relation to said convex portion 17, the projection 19 being adapted to engage an annular groove 18 formed in the outer periphery of the outer member 14 of the constant velocity joint 13. In addition, FIG. 2 shows the boot fixing portion 12 on the larger diameter side, but the boot fixing portion 12 on the smaller diameter side has exactly the same construction and, for brevity, an illustration and description thereof are omitted (this applies also to the following embodiments).

Figure 3:
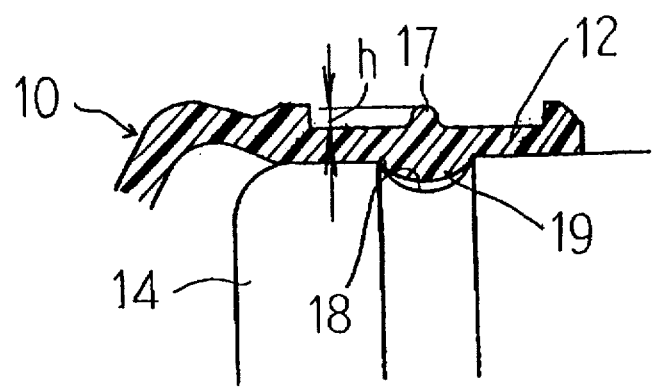
FIG. 3 is a fragmentary enlarged view in longitudinal section, showing the state prior to the tightening of the boot fixing portion in FIG. 2.

The convex portion 17, as shown in FIG. 3, rises by a predetermined height (h) from the outer peripheral surface of the boot fixing portion 12 before it is tightened and fixed by the boot band 16. As for the boot band 16, a one-touch band or an Oetiker type band is used. In use, it is fitted on the outer periphery of the boot fixing portion 12 and diametrically contracted. The attachment of the boot fixing portion 12 is effected by fitting the boot fixing portion 12 on the outer periphery of the outer member 14, fitting, as shown in FIG. 2, the boot band 16 on the outer periphery of the boot fixing portion 12, and tightening the boot fixing portion 12 by the boot band 16.

Figure 4:
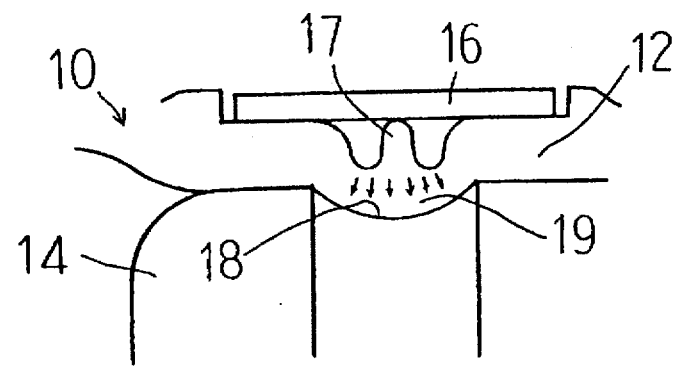
FIG. 4 is a fragmentary enlarged view in longitudinal section, showing the state of pressed deformation of the boot fixing portion shown in FIG. 2, in the vicinity of its convex portion.

During this step of tightening and fixing the boot fixing portion 12 by the boot band 16, the convex portion 17 is pressed radially inward by the tightening force of the boot band 16 such that this pressing force, as shown in FIG. 4, causes the boot fixing portion 12 to produce an elastic deformation starting at the root of the convex portion 17, displacing the inner peripheral projection 19 toward the annular groove 18. And as the tightening force of the boot band 16 increases, the inner peripheral projection 19 is fitted into the annular groove 18 along its shape until it is firmly engaged and intimately contacted with the annular groove 18. Therefore, even if the height of the inner peripheral projection 19 of the boot fixing portion 12 is relatively small, since powerful engaging adhesion to the annular groove 18 is obtained, the high strength to prevent the boot fixing portion 12 from slipping off and the sealing performance are ensured. Also, the inner peripheral projection 19 makes axial location of the boot fixing portion 12 to the outer member 14 easy when fitting the boot fixing portion 12 on the outer member 14.

Figure 5:
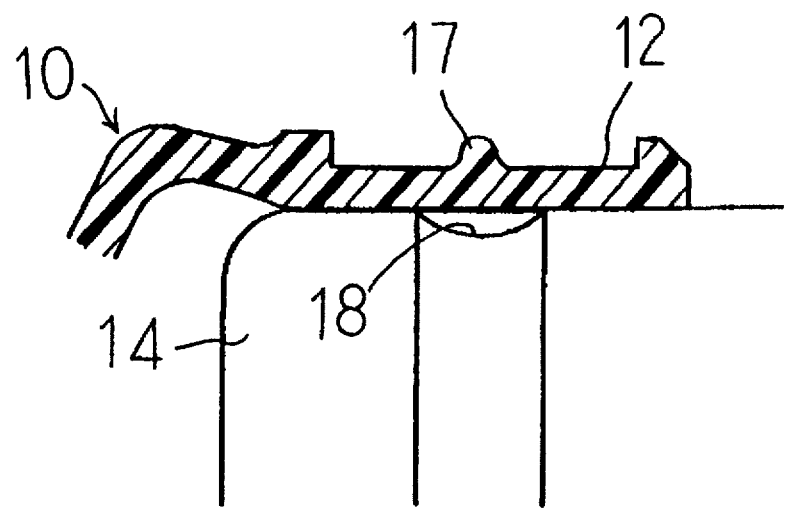
FIG. 5 is a fragmentary enlarged view in longitudinal section, showing the state prior to the tightening of the boot fixing portion of a resin boot according to another embodiment of the present invention.
Figure 6:
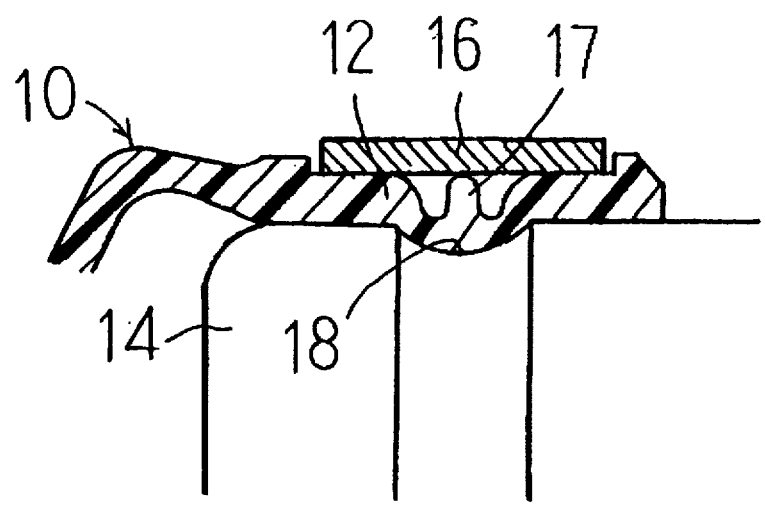
FIG. 6 is a fragmentary enlarged view in longitudinal section, showing the state after the tightening of the boot fixing portion shown in FIG. 5.

FIG. 5 shows another embodiment of the present invention. This embodiment has the same arrangement as shown in FIGS. 1 through 4 except that it is devoid of the inner peripheral projection 19 formed on the inner periphery of the boot fixing portion 12. In this case, as shown in FIG. 6, when the convex portion 17 is pressed radially inward by the boot band 16, the boot fixing portion 12 produces an elastic deformation starting at the root of the convex portion 17 such that the inner peripheral region of the boot fixing portion 12 opposed to the convex portion 17 is displaced toward the annular groove 18. And as the tightening force of the boot band 16 increases, the inner peripheral region is fitted into the annular groove 18 along its shape until it is firmly engaged and intimately contacted with the annular groove 18. Therefore, even if the inner periphery of the boot fixing portion 12 is not provided with the annular inner projection 19, since powerful engaging adhesion to the annular groove 18 is obtained, the high strength to prevent the boot fixing portion 12 from slipping off and the sealing performance are ensured.

Figure 7:
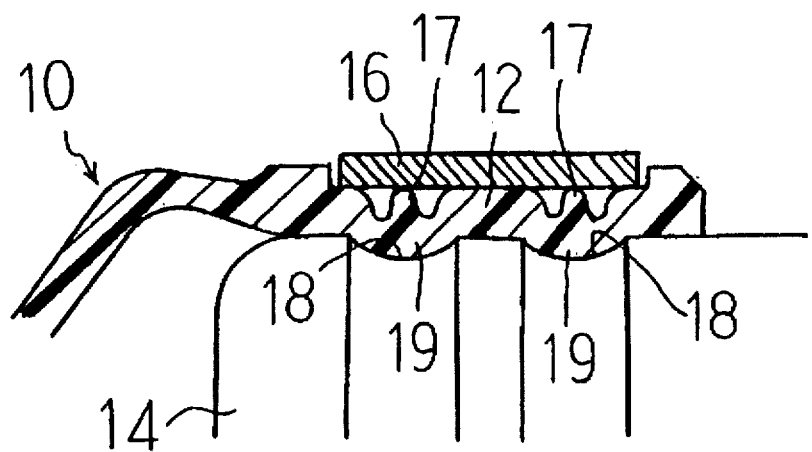
FIG. 7 is a fragmentary enlarged view in longitudinal section, showing the state after the tightening of the boot fixing portion of a resin boot according to another embodiment of the invention.

FIG. 7 shows an embodiment wherein the outer periphery of the outer member 14 is formed with a plurality of, e.g., two, annular grooves 18 while the boot fixing portion 12 is integrally formed with a plurality of, e.g., two, convex portions 17 on its outer periphery and two inner peripheral projections 19 opposed to the annular grooves 18. The two convex portions 17 are pressed radially inward by the boot band 16 to force the two inner peripheral projections 19 into firm engagement and intimate contact with the annular grooves 18, whereby the strength to prevent the boot fixing portion 12 from axially slipping off and the sealing performance are obtained.

Figure 8:
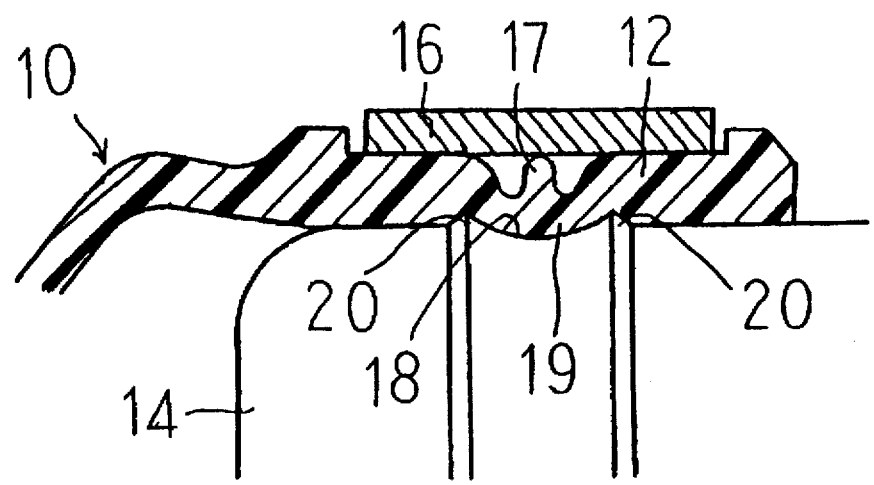
FIG. 8 is a fragmentary enlarged view in longitudinal section, showing the state after the tightening of the boot fixing portion of a resin boot according to another embodiment of the invention.

FIG. 8 shows an embodiment wherein the shoulders of the annular groove 18 is formed with annular projections 20. When the boot fixing portion 12 is elastically deformed by the pressing force from the convex portion 17, the inner periphery of the boot fixing portion 12 is pressed hard against the projections 20 at the opposite lateral regions of the inner peripheral projection 19, with the stresses in the regions locally increased to accelerate the elastic deformation of the boot fixing portion 12, making it easier for the inner peripheral projection 19 to be displaced toward the annular groove 18. Further, after attachment, the projections 20 penetrate into the inner periphery of the boot fixing portion 12 to hold the latter, thereby enhancing the strength to prevent the boot fixing portion 12 from axially slipping off and the sealing performance.

Figure 9:
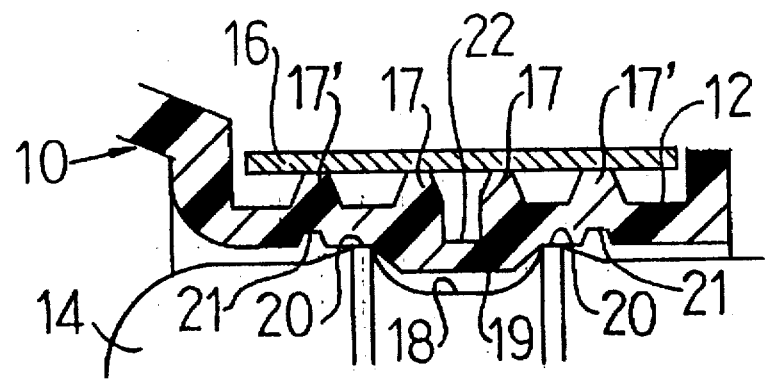
FIG. 9 is a fragmentary enlarged view in longitudinal section, showing the state prior to the tightening of the boot fixing portion of a resin boot according to another embodiment of the invention.

In an embodiment shown in FIG. 9, like the one shown in FIG. 8, the shoulders of the engaging groove 18 is formed with annular projections 20. In this embodiment, the outer periphery of the boot fixing portion 12 is formed with a plurality of, e.g., two, convex portions 17 opposed to the annular groove 18 and two convex portions 17' each axially displaced beyond the position where the projection 20 is formed. When the convex portions 17 and 17' are pressed radially inward by tightening the boot band 16 from the state shown in the figure, the boot fixing portion 12 is subjected to a pressing force from the convex portions 17 and 17' with the projections 20 serving as fulcrums, whereby it is elastically deformed such that it flexes on the opposite sides of each projection 20. As a result, the elastic deformation of the boot fixing portion 12 is further accelerated and the amount of penetration of the projections 20 increases after attachment. Therefore, the strength to prevent the boot fixing portion 12 from axially slipping off and the sealing performance are enhanced. In addition, in this embodiment, the regions of the inner periphery of the boot fixing portion 12 opposed to the convex portions 17 are formed with annular reliefs 21 and the regions of the outer periphery of the boot fixing portion 12 between the convex portions 17 is formed with an annular relief 22, in consideration of easier elastic deformation of the boot fixing portion 12.

Figure 10:
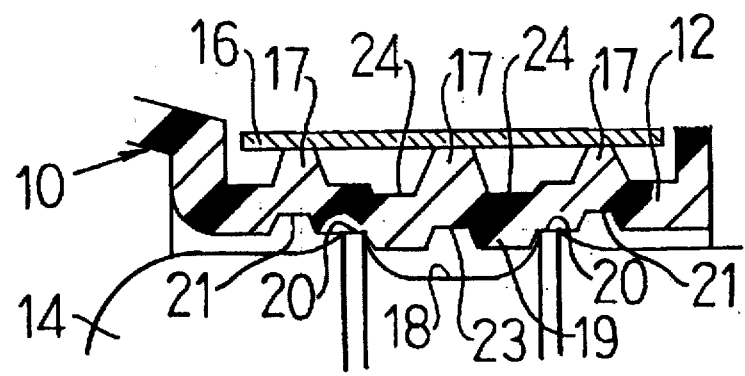
FIG. 10 is a fragmentary enlarged view in longitudinal section, showing the state prior to the tightening of the boot fixing portion of a resin boot according to another embodiment of the invention.

An embodiment shown in FIG. 10 is basically the same as the one shown in FIG. 9 except that it is only one convex portion 17 that is in opposed relation to the annular groove 18. Further, the regions of the inner periphery of the boot fixing portion 12 opposed to the convex portion 17 is formed with an annular relief 23, while the regions of the outer periphery of the boot fixing portion 12 on opposite sides of the convex portion 17 are formed with annular reliefs 24.

Figure 11:
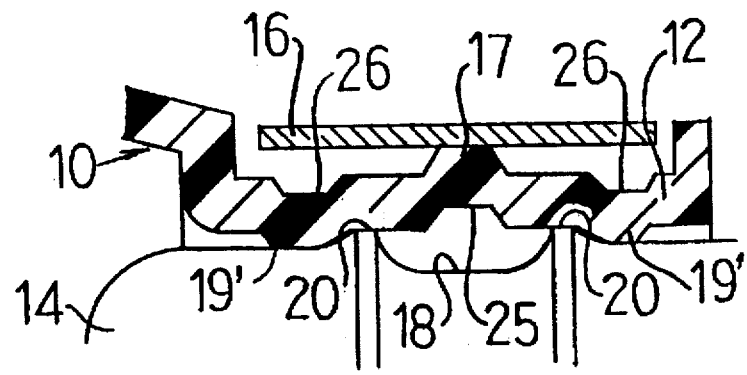
FIG. 11 is a fragmentary enlarged view in longitudinal section, showing the state prior to the tightening of the boot fixing portion of a resin boot according to another embodiment of the invention.

An embodiment shown in FIG. 11 is basically the same as the one shown in FIG. 8 except that the inner periphery of the boot fixing portion 12 is formed with two annular projections 19', the position where one such projection 19' is formed being displaced away from the associated projection 20. Further, the regions of the inner periphery of the boot fixing portion 12 opposed to the convex portion 17 is formed with an annular relief 25, while the regions of the outer periphery of the boot fixing portion 12 opposed to the inner peripheral projections 19' are formed with annular reliefs 26.

Figure 12:
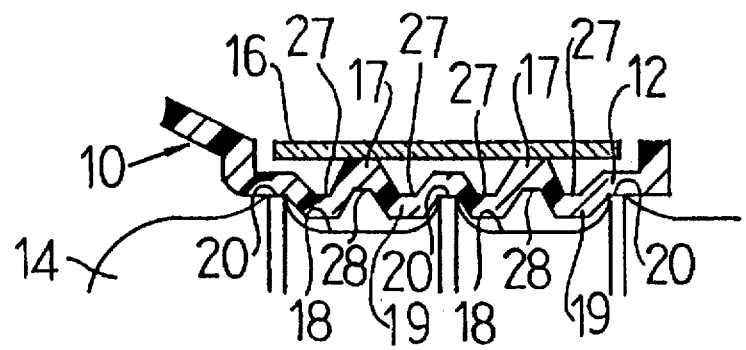
FIG. 12 is a fragmentary enlarged view in longitudinal section, showing the state prior to the tightening of the boot fixing portion of a resin boot according to another embodiment of the invention.

In an embodiment shown in FIG. 12, the outer periphery of the outer member 14 is formed with a plurality of, e.g., two, annular grooves 18, each of which is externally formed at its opposite shoulders with projections 20. The projection 20 between the annular grooves 18 is a common shoulder; in this embodiment, there are a total of 3 projections 20. The outer periphery of the boot fixing portion 12 is integrally formed with two convex portions 17 in opposed relation to the annular grooves 18, while the inner periphery of the boot fixing portion 12 is integrally formed with two inner peripheral projections 19 in opposed relation to the annular grooves 18. Further, the regions of the outer periphery of the boot fixing portion 12 are formed with annular reliefs 27, while the regions of the inner periphery of the boot fixing portion 12 opposed to the convex portions 17 are formed with annular reliefs 28, and the wall thickness of the boot fixing portion 12 is decreased as compared with those in the above embodiments, in consideration of easier elastic deformation of the boot fixing portion 12.

In addition, FIGS. 9 through 12 each show the state before the boot band 16 is tightened (before the boot fixing portion 12 is elastically deformed), but various shapes of the convex portion 17, besides the semicircular shown in FIGS. 2 through 8 and the trapezoid shown in FIGS. 9 through 12, polygon, and triangle, may be contemplated; the invention is not limited to the examples given above. Further, in the arrangement shown in FIGS. 8 through 12, an arrangement may be made in which the outer periphery of the outer member 14 are provided with only projections 20 without providing annular grooves 18. In that case, it is desirable for the projections 20 to have somewhat greater height.

Figure 13:
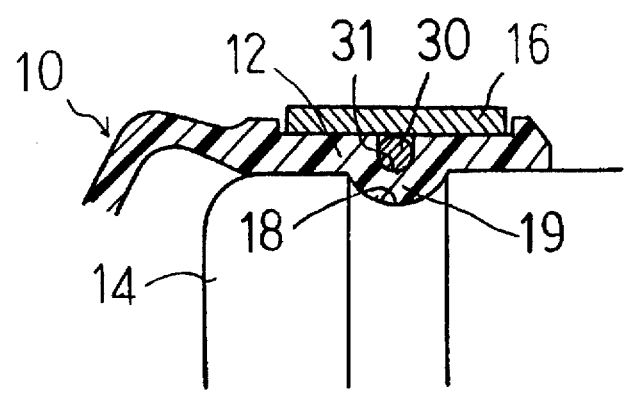
FIG. 13 is a fragmentary enlarged view in longitudinal section, showing the state after the tightening of the boot fixing portion of a resin boot according to another embodiment of the invention.
Figure 14:
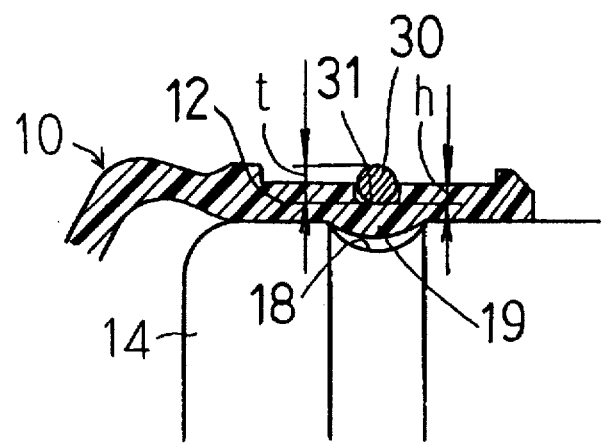
FIG. 14 is a fragmentary enlarged view in longitudinal section, showing the state prior to the tightening of the boot fixing portion shown in FIG. 13.

In an embodiment shown in FIG. 13, the boot fixing portion 12 has an annular fitting groove 31 in which an annular member 30 is fitted, and also has, on its inner periphery, an inner peripheral projection 19 in opposed relation to the fitting groove 31 and adapted to engage the annular groove 18 formed in the outer periphery of the outer member 14. As shown in FIG. 14, with the fitting groove 31 shown in the state before the boot fixing portion 12 fitted on the outer member 14 is tightened and fixed by the boot band 16, the fitting groove 31 has a depth (h) which is smaller than a sectional height (t) of the annular member 30 fitted therein so that the annular member 30 projects beyond the outer peripheral surface of the boot fixing portion 12.

Figure 15A:
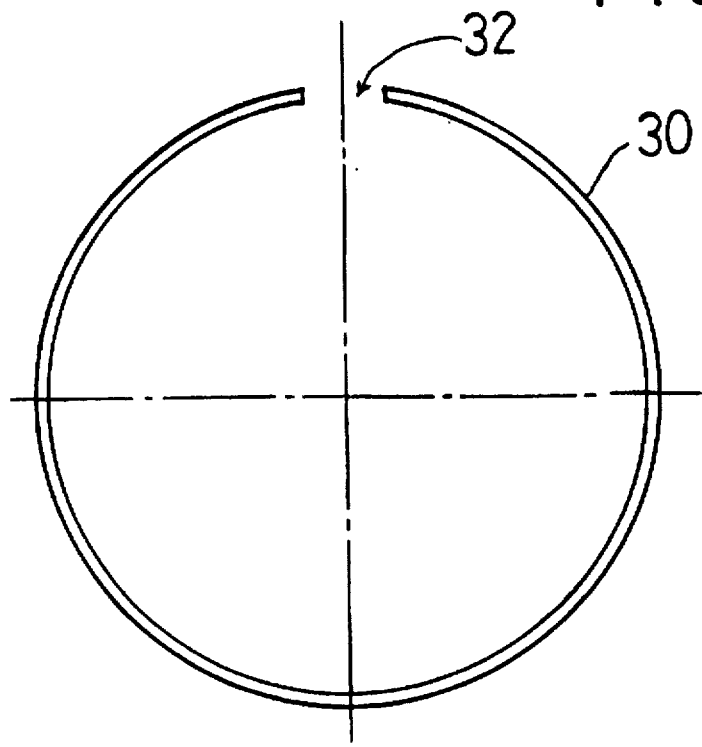
FIG. 15 is a front view (figure a) and a sectional view (figure b), showing an annular member in FIGS. 13 and 14.
Figure 15B:
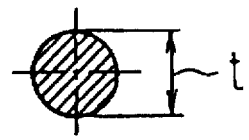

The annular member 30 is made of a material which has higher rigidity than the resin boot 10, e.g., metal, and has a cut 32 at a place on its circumference, as shown in FIG. 15. The cut 32 is sized such that the cut ends do not contact each other when the annular member 30 is fitted in the fitting groove 31 and tightened by the boot band 16. In addition, the sectional shape of the annular member 30 is circular in FIG. 15 (b), but it may be of other shape, e.g., a polygon.

As for the boot band 16, use is made of a one-touch band or Oetiker band; it is fitted on the outer periphery of the boot fixing portion 12 and is diametrically contracted, thereby tightening and fixing the boot fixing portion 12.

Figure 16:
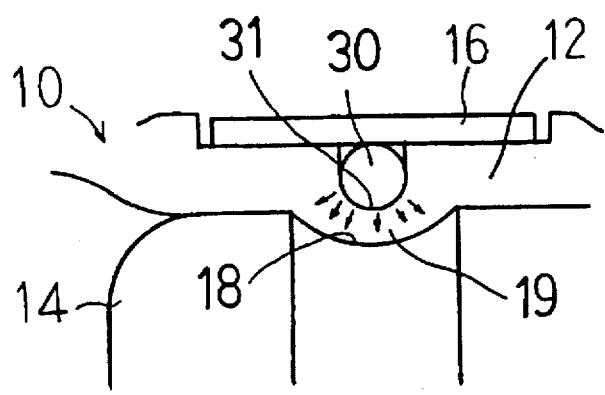
FIG. 16 is a fragmentary enlarged view in longitudinal section, showing the state of pressed deformation of the boot fixing portion shown in FIG. 13, in the vicinity of the annular annular member.

To install the resin boot 10 between the outer member 14 of the constant velocity joint 13 and the shaft 15, as shown in FIG. 14, the boot fixing portion 12 is fitted on the outer member 14 and then the annular member 30 is fitted in the fitting groove 31 of the boot fixing portion 12. And, as shown in FIG. 13, the boot band 16 is fitted on the outer periphery of the boot fixing portion 12, then the boot fixing portion 12 being tightened and fixed by the boot band 16. During the step of tightening and fixing the boot fixing portion 12 by the boot band 16, the annular member 30 radially inwardly presses the fitting groove 31 of the boot fixing portion 12 in the vicinity of the groove bottom, as indicated by arrows in FIG. 16, the pressing elastically deforming the inner peripheral projection 19 of the boot fixing portion 12 to force it into the annular groove 18 of the outer member 14 along the groove shape, until the inner peripheral projection 19 is intimately contacted with the annular groove 18. Thus, even if the height of the inner peripheral projection 19 on the inner periphery of the boot fixing portion 12 is small, its engagement with the annular groove 18 of the outer member 14 is powerful, thereby enhancing the strength to prevent the boot fixing portion 12 from axially slipping off and the sealing performance.

Figure 17:
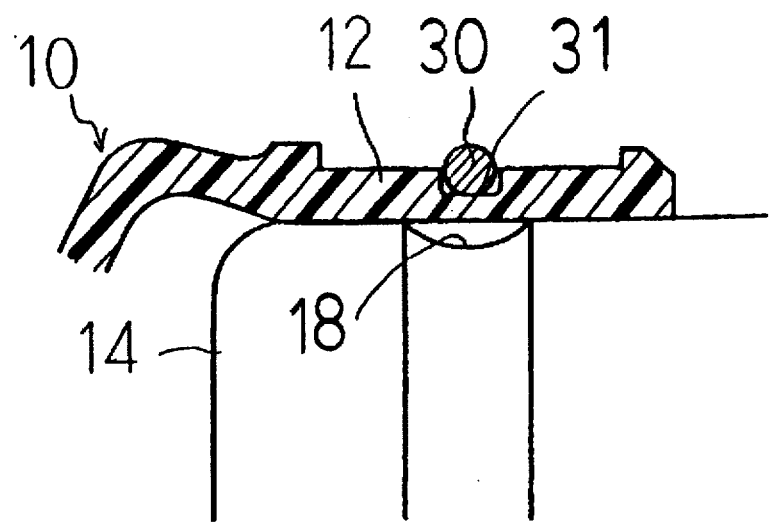
FIG. 17 is a fragmentary enlarged view in longitudinal section, showing the state prior to the tightening of the boot fixing portion of a resin boot according to another embodiment of the invention.
Figure 18:
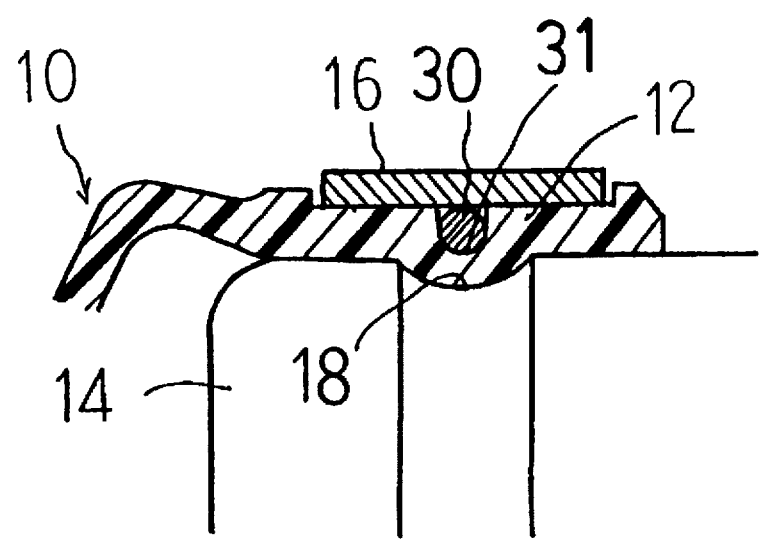
FIG. 18 is a fragmentary enlarged view in longitudinal section, showing the state after the tightening of the boot fixing portion shown in FIG. 17.

In an embodiment shown in FIG. 17, there is no annular inner peripheral projection 19 on the inner periphery of the boot fixing portion 12. In this case, as shown in FIG. 18, when the boot fixing portion 12 is fitted on the outer member 14 and is tightened and fixed by the boot band 16, the radially inward pressing of the fitting groove 31 of the boot fixing portion 12 in the vicinity of the groove bottom by the annular member 30 causes the region of the inner periphery of the boot fixing portion 12 opposed to the fitting groove 31 to be elastically deformed to be forced into the annular groove 18 of the outer member 14 along the groove shape until the region the inner periphery of the boot fixing portion 12 is intimately contacted with the annular groove 18. Thus, even if the inner periphery of the boot fixing portion 12 is devoid of an annular inner peripheral projection 19, since the region of the inner periphery of the boot fixing portion 12 is firmly engaged with the annular groove 18, the strength to prevent the boot fixing portion 12 from axially slipping off and the sealing performance are enhanced.

Figure 19:
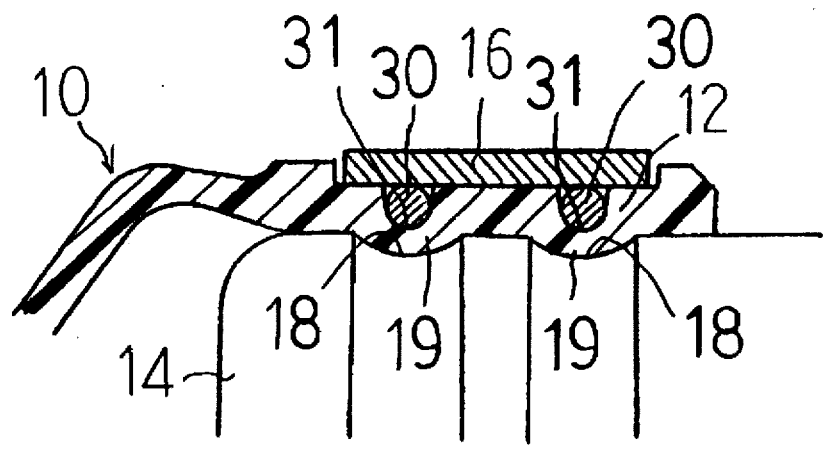
FIG. 19 is a fragmentary enlarged view in longitudinal section, showing the state after the tightening of the boot fixing portion of a resin boot according to another embodiment of the invention.

FIG. 19 shows an embodiment wherein the outer periphery of the boot fixing portion 12 is formed with a plurality of, e.g., two, fitting grooves 31 and a plurality of, e.g., two, annular members 30 are fitted in the fitting grooves 31, thereby maintaining the strength to prevent the boot fixing portion 12 from axially slipping off and the sealing performance at high value.

Figure 20:
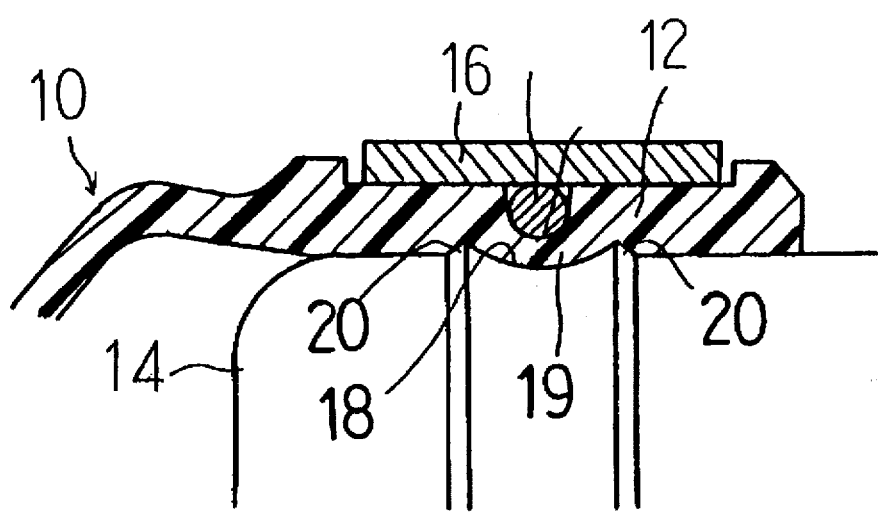
FIG. 20 is a fragmentary enlarged view in longitudinal section, showing the state after the tightening of the boot fixing portion of a resin boot according to another embodiment of the invention.
Figure 21:
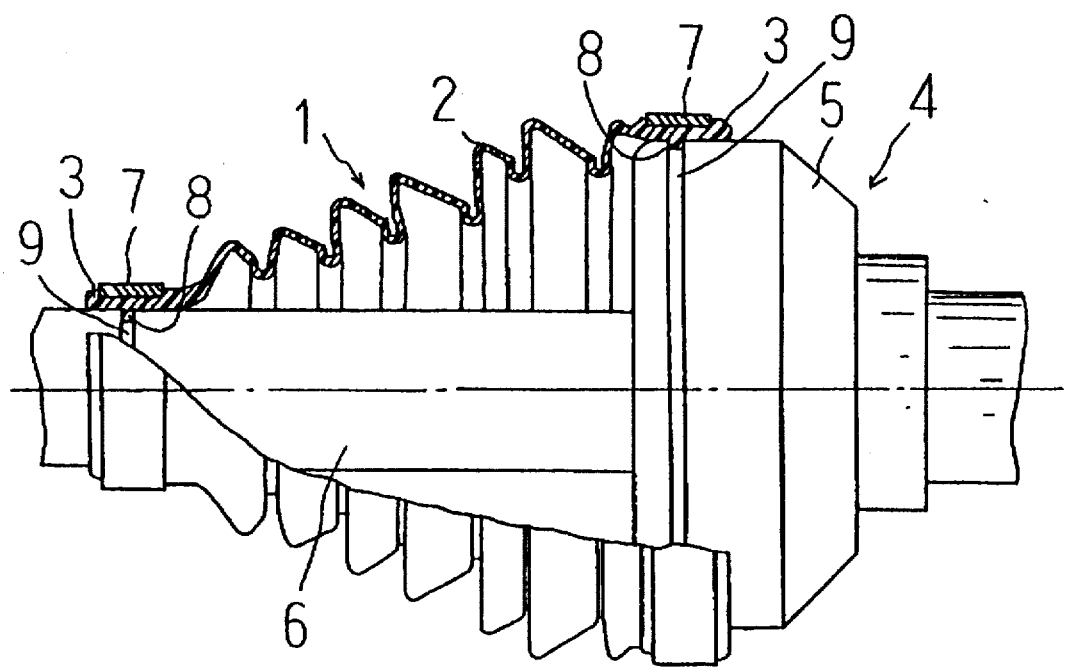
FIG. 21 is a view, partly in longitudinal section, showing a resin boot according to the prior art, attached to a constant velocity joint.
Figure 22:
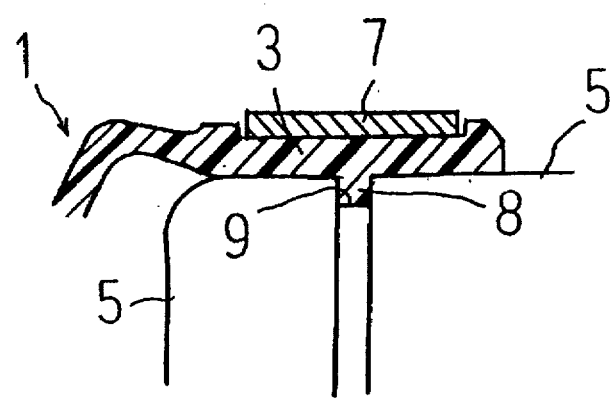
FIG. 22 is a fragmentary enlarged view in longitudinal section, showing the boot fixing portion in FIG. 21.

FIG. 20 shows an embodiment wherein the opposite shoulders of the annular groove 18 formed in the outer member 14 of a constant velocity Joint 13 are formed with projections 20 throughout the circumference thereof, said projections 20 ensuring stronger engagement between the inner peripheral projection 19 of the boot fixing portion 12 and the annular groove 18 of the outer member 14.

What is claimed is:

1. A resin boot comprising a cylindrical boot fixing portion at an end thereof adapted to be fixed in position to a mating member by a boot band having a cylindrical inner surface, said boot fixing portion having an outer periphery on which the boot band is fitted, and an inner periphery fitted on an outer periphery of the mating member, said outer periphery of said boot fixing portion being provided with an annular convex portion disposed adjacent to an annular groove formed on the outer periphery of the mating member, wherein during a pre-tightening state, said annular convex portion projects radially outwardly from said outer periphery of said boot fixing portion, and said inner periphery of said boot fixing portion is substantially out of direct contact with the annular groove to define a pre-tightened annular groove cavity between said inner periphery of said boot fixing portion and the annular groove, and wherein during a tightening state, said inner periphery of said boot fixing portion is displaced radially inward by a tightening force of the boot band exerted on said annular convex portion to cause said inner periphery to firmly engage with the annular groove, said annular convex portion being displaced radially inwardly to conform with the cylindrical inner surface of the boot band.

2. A resin boot as set forth in claim 1, wherein said annular convex portion is integrally formed on said outer periphery of said boot fixing portion.

3. A resin boot as set forth in claim 1, wherein said annular convex portion is an annular member fitted on said outer periphery of said boot fixing portion.

4. A resin boot as set forth in claim 1, wherein said annular convex portion is an annular fitting groove fitted into said outer periphery of said boot fixing portion and fitting in said annular fitting groove an annular member whose sectional height is greater than the depth of said fitting groove.

* * * * *